US005721052A

United States Patent [19]
Muthiah et al.

[11] Patent Number: 5,721,052
[45] Date of Patent: Feb. 24, 1998

[54] TEXTURED EPOXY POWDER COATING COMPOSITIONS FOR WOOD SUBSTRATES AND METHOD OF COATING WOOD THEREWITH

[75] Inventors: Jeno Muthiah, Wernersville; Andrew T. Daly, Sinking Spring; Richard P. Haley, Reading; Paul R. Horinka, Reading; Joseph J. Kozlowski, Reading; Glenn D. Correll, Birdsboro, all of Pa.

[73] Assignee: Morton International, Inc., Chicago, Ill.

[21] Appl. No.: 744,035

[22] Filed: Nov. 5, 1996

Related U.S. Application Data

[63] Continuation-in-part of Ser. No. 647,327, May 6, 1996.

[51] Int. Cl.$^6$ .................................................. B32B 27/38
[52] U.S. Cl. ..................... 428/413; 427/195; 427/386; 427/485; 427/542; 525/526; 525/934
[58] Field of Search ........................... 427/195, 386, 427/485, 542; 525/526, 934; 428/413

[56] References Cited

U.S. PATENT DOCUMENTS

| | | | |
|---|---|---|---|
| 3,130,067 | 4/1964 | Bulgin | 117/47 |
| 3,236,679 | 2/1966 | Spiller et al. | 117/93.4 |
| 3,578,484 | 5/1971 | Walles et al. | 117/47 |
| 3,996,410 | 12/1976 | Gruetzman | 428/539 |
| 4,341,819 | 7/1982 | Schreffler et al. | 427/195 |
| 4,360,385 | 11/1982 | Grunewalder | 106/2 |
| 4,568,606 | 2/1986 | Hart et al. | 428/379 |
| 4,637,954 | 1/1987 | Ohsumi | 428/342 |
| 4,686,108 | 8/1987 | Nason et al. | 427/27 |
| 4,747,546 | 5/1988 | Talacko | 239/707 |
| 4,855,358 | 8/1989 | Hart | 525/113 |
| 4,857,362 | 8/1989 | Hart | 427/195 |
| 5,212,263 | 5/1993 | Schreffler | 525/533 |
| 5,344,672 | 9/1994 | Smith | 427/195 |
| 5,387,442 | 2/1995 | Kroegen et al. | 427/521 |

OTHER PUBLICATIONS

Richard, D.S. *Applying Powder On A Wooden Substrate,* Powder Coating, Apr. 1996.

Shell Oil Company Technical Bulletin, *Epon Curing Agent© P–101,* Sep. 1992.

*Primary Examiner*—Michael Lusignan
*Attorney, Agent, or Firm*—Steven C. Benjamin; Gerald K. White

[57] ABSTRACT

Thermosetting powder coating compositions adapted to form a grainy textured finish on heat sensitive substrates, especially wood products, such as particle board, conductive particle board, and medium density fiber board, without damaging the substrates comprise an epoxy resin, particularly bisphenol A type epoxy resins having low viscosities, either a catalytic curing agent comprising an imidazole, a substituted imidazole, or adduct of an imidazole or substituted imidazole and an epoxy resin, or a curing agent comprising an adduct of a polyamine and an epoxy resin, or a combination of the catalytic curing agent and curing agent, a texturing agent, a flow control agent, optional extender, and optional pigment. The thermosetting powder coatings have a cure time/temperature ranging from about 30 seconds at about 350° F. peak substrate temperature down to about 20 minutes at about 225° F. peak substrate temperature which provides for either a rapid cure or low bake temperature to prevent excessive heat exposure to the heat sensitive substrate, resulting in substantially no physical or chemical degradation of the heat sensitive substrate during baking. The powder coatings are applied to heat sensitive substrates, especially wood products, through electrostatic spraying onto the substrate followed by heating to cure the textured finish uniformly on the surfaces and edges of the substrate. Electrostatic spraying is performed with a triboelectric or corona spray gun and heat curing is performed with a high intensity infrared oven, a convection oven, or combination. Coated heat sensitive substrates having continuous grainy textured finishes that are excellent for hiding substrate surface defects and later appearing scratches are obtained.

52 Claims, No Drawings

TEXTURED EPOXY POWDER COATING COMPOSITIONS FOR WOOD SUBSTRATES AND METHOD OF COATING WOOD THEREWITH

RELATED APPLICATION

This application is a continuation-in-part of copending U.S. patent application Ser. No. 08/647,327, filed May 6, 1996.

FIELD OF THE INVENTION

This invention relates to compositions useful as thermosetting powder coatings for heat sensitive materials, such as wood substrates. These coatings are applied to the surfaces of wood substrates in particulate form and then fused and cured at relatively lower temperatures and/or relatively faster cure rates to form continuous dry film coatings without physical or chemical degradation of the substrate. More particularly, this invention relates to epoxy based powder coating compositions for wood substrates which are first applied by electrostatic spraying and next heat cured thereon at relatively lower temperatures and/or relatively faster rates to form durable grainy textured finishes without damaging the wood.

BACKGROUND OF THE INVENTION

Powder coating compositions are extremely desirable in painting articles in that they are virtually free of fugitive organic solvents conventionally utilized in liquid paint systems. Thus, powder coatings give off little, if any volatile material to the environment when heat cured. This eliminates numerous problems of air pollution and dangers to the health of workers employed in painting operations.

Solventless fusion coating processes have been developed to apply such powder coatings on substrates in which the dry, finely divided, free flowing, heat fusible powders are deposited on the substrate and then fused and cured with external heating into a continuous protective or decorative film. Examples of such coating processes include electrostatic spray, fluidized bed, and electrostatic fluidized bed techniques, with electrostatic spray principally being used in the industry today.

Electrostatic spray coating, however, has been problematic for coating of heat sensitive materials, such as wood, paper, cardboard and plastic substrates, since the curing takes place at rather high temperatures typically greater than 350° F. at normal oven dwell times, made necessary by the high curing temperatures of the paint powders and maintaining these high temperatures for a period of time to achieve the desired cure. Heat sensitive materials, however, cannot withstand such high temperatures for a continuous time necessary for powder coatings. For instance, the resinous binders and moisture that maintain the integrity of wood products, such as particle board or fiber board, tend to degrade and volatilize at temperatures required for curing powder coatings at acceptable rates. This causes the wood board to deteriorate in physical and/or chemical properties which is unacceptable.

U.S. Pat. No. 5,387,442 (Kroeger et al.) discloses a method of electrostatic spray coating heat sensitive materials, such as plastic materials, wood, paper, cardboard, leathers and textiles with thermosetting powder paint compositions, which method is based on short repetitive cycles of high intensity infrared heating that are interspersed with cooling cycles. In this way, it is claimed that the heat necessary for causing melting, film formation and subsequent curing of the top powder coat does not have time to attack the heat sensitive material of the substrate in a damaging or worsening way, since the heat is rapidly dissipated during the cooling intervals. However, this method fails to teach how to avoid using thermosetting powder coatings having higher temperature cure and/or slower cure rate requirements altogether when coating heat sensitive materials. In Kroeger et al., it is shown that the substrate still sees temperatures on the average of about 390° F. for about 20 minutes to cure the powder coatings.

Thermosetting powder coatings based on epoxy resins are known in the art. Examples of epoxy powder coatings for non-heat sensitive metal substrates where the substrates were heated to about 450° F. prior to electrostatic spraying the powders can be found in U.S. Pat. Nos. 4,568,606 (Hart et al.), 4,855,358 (Hart), and 4,857,362 (Hart). Epoxy powder coatings that produce grainy textured or wrinkled finishes for usually heat resistant metal substrates to better hide substrate surface imperfections and scratches are known in the art as well. An example of a wrinkled finish epoxy powder coating can be found in U.S. Pat. No. 4,341,819 (Schreffler et al.). In U.S. Pat. No. 5,212,263 (Schreffler), an powder coating adapted to form a textured finish is disclosed which contains an epoxy resin, a methylene disalicylic acid curing agent for the epoxy, and an adduct of imidazole and bisphenol A type epoxy resin as the cure catalyst. Generally speaking, the latter two patents show that it takes their respective epoxy powder coating formulations to melt and cure at peak substrate temperatures in excess of about 375° F. for about 10 minutes.

Low temperature cure and/or rapid cure rate powder coatings for providing smooth finishes when electrostatically sprayed on wood products, such as TV stands made of medium density fiber board have been proposed. Such smooth formulations contained an epoxy resin and an adduct of imidazole and an epoxy resin as a curing agent for the epoxy, but did not contain texturing agents. Despite having desirable cure properties for heat sensitive substrates, these powder coatings were found to be unsatisfactory for electrostatic spray coating on wood articles because of inadequate hiding of surface imperfections and inadequate edge coverage provided. In addition, pinholes were visually evident in the final/coatings as a result of volatiles escaping through partially cured films. This led to a discontinuous film which exposed the substrate and left it unprotected.

What is needed is a powder coating composition that can be coated, particularly electrostatic spray coated, at lower temperatures and/or faster cure rates on heat sensitive materials, particularly wood products, to produce continuous grainy textured finishes to adequately hide surface imperfections, without damaging or worsening the physical and/or chemical properties of the substrate coated therewith.

SUMMARY OF THE INVENTION

It is an object of the present invention to provide epoxy based powder coating compositions that can be coated, particularly electrostatically spray coated, and cured on heat sensitive substrates, particularly wood products, without damaging the substrate.

It is another object of the present invention to provide epoxy based powder coating compositions that allow the powder to flow, film and subsequently cure at significantly lower temperatures and/or significantly faster rates in order to allow electrostatic spray coating on heat sensitive wood substrates without damaging the wood.

It is yet another object of the present invention to provide low temperature and/or rapid cure epoxy based powder coatings that produce grainy textured finishes with increased hiding power and better coverage of edges on electrostatically spray coated wood substrates.

It is yet another object of the present invention to form a continuous coating that is aesthetically acceptable without any visual evidence of outgassing, bubbling, or pin hole formation.

It is still another object of the present invention to provide a method of coating, particularly electrostatic spray coating, textured finishes on heat sensitive substrates, particularly wood substrates at cure temperatures of about 350° F. or much lower down to about 225° F. or less for acceptable oven dwell times using the aforesaid powder coatings having rapid cure and/or low temperature cure properties without damaging or worsening the properties of the substrate.

It is still another object of the present invention to provide a coated, particularly an electrostatically spray coated, heat sensitive substrate, especially a coated wood product, having a decorative and protective textured finish, which substrate has been uniformly coated with the aforesaid low temperature and/or rapid cure powder coatings without being damaged from excessive heat exposure during coating.

In one aspect, the present invention resides in a thermosetting powder coating composition for forming a continuous grainy textured finish on heat sensitive materials, which is a composition in particulate form comprising a blend of an epoxy resin, a catalytic curing agent which comprises an imidazole or an adduct of imidazole and epoxy resin, a texturing agent, and a flow control agent. The epoxy resin is preferably selected from bisphenol A type epoxy resins having epoxy equivalent weights of between about 600 and 750 and mixtures of such epoxy resins. The catalytic curing agent is preferably selected from a substituted imidazole or an adduct of imidazole or substituted imidazole and a bisphenol A type epoxy resin. The texturing agent is preferably selected from an organophilic clay, rubber particles, and thermoplastic polymer particles. The flow control agent is preferably selected from an acrylic resin and benzoin. The composition can also include extenders preferably selected from calcium carbonate and pigments. The powder coating composition can be cured on heat sensitive wood substrates at conditions of time and temperature that do not deteriorate the integrity of wood. The composition preferably has a cure time/temperature range of from about 30 seconds at about 350° F. peak substrate temperature down to about 20 minutes at about 225° F. peak substrate temperature.

In a second aspect, the present invention resides in another low temperature and/or rapid cure thermosetting powder coating composition for forming a continuous grainy textured finish on heat sensitive materials, which is a composition in dry solid particulate form comprising a blend of an epoxy resin, a curing agent which comprises an adduct of polyamine and epoxy resin, an optional secondary curing agent which comprises dicyandiamide, an optional catalytic curing agent which comprises an imidazole or an adduct of imidazole and epoxy resin, a texturing agent, and a flow control agent. The curing agent is preferably selected from an adduct of a primary or secondary polyamine and a bisphenol A type epoxy resin. The other listed ingredients are the same as those previously mentioned. This alternative composition preferably also has a cure time/temperature range of from about 30 seconds at about 350° F. peak substrate temperature down to about 20 minutes at about 225° F. peak substrate temperature.

In another aspect, the invention resides in a method of coating a heat sensitive material, particularly wood substrates, with any of the aforesaid thermosetting powder coating compositions that are adapted to provide a continuous grainy textured finish without damaging the substrate, which includes electrostatically spraying any of the thermosetting powder coating compositions onto the heat sensitive substrate, and then heating the applied powder coating and the substrate to melt and cure the powder coating as a grainy textured film on the substrate without causing damage to the substrate. The wood substrates can include, without limitation, hardwood, particle board, electrically conductive particle board and medium density fiber board.

In still another aspect, the invention resides in a coated heat sensitive material, particularly a wood substrate, that has been coated with any of the aforesaid thermosetting powder coating compositions using the aforesaid method. The coated wood product obtains a uniform continuous textured finish over the entire substrate to provide a decorative finish that has excellent ability to hide surface imperfections and later appearing scratches.

DETAILED DESCRIPTION OF THE PREFERRED EMBODIMENTS OF THE INVENTION

The thermosetting powder coating compositions of the present invention contain as one component, an epoxy resin. The epoxy resins useful in the thermosetting powder coatings of this invention are solid resins or blends of solid and small amounts of liquid resins up to about 10 wt. %, which resins are the reaction products of a diol and a halohydrin. Suitable epoxy resins useful in the practice of this invention are exemplified by, but not limited to, the reaction products of bisphenol A and epichlorohydrin. Generally, the bisphenol A type epoxies used herein are of the type 1 to type 9 form, with the low viscosity type 3 or less epoxy resins being most preferred. The useful bisphenol A type epoxy resins have an epoxy equivalent weight ranging between about 400 and 2,250, preferably an epoxy equivalent weight of between about 550 and 1,100, with an epoxy equivalent weight of between about 600 and 750 being most preferred. Preferred epoxy resins include those sold under the tradename Araldite GT 7013 (type 3) and Araldite GT 7072 (type 2) by Ciba-Geigy Corporation, which are both 4,4'-isopropylidene-diphenol-epichlorohydrin type epoxy resins.

The thermosetting powder coating compositions of the present invention contain as another component, a catalytic curing agent. In the present invention, the catalytic curing agent serves the dual function of curing agent and cure accelerator. No other curing agents need to be present in the powder coating compositions of the present invention. The advantage of this catalytic curing agent component is that it alone allows the powdered coatings of the present invention to cure at much lower cure temperatures or at ultra rapid cure rates than ever thought possible with textured powder coatings, thereby allowing such compositions to be coated on heat sensitive materials, especially wood substrates, without deteriorating the physical and/or chemical properties of the substrate.

The catalytic curing agents which may be employed in the thermosetting powder coating compositions of this invention are an imidazole, a substituted imidazole, or adducts of an imidazole or substituted imidazole and an epoxy resin or quaternary ammonium salts thereof, and mixtures of any of the aforesaid materials. Most preferably a substituted imidazole of 2-methylimidazole is used. Another suitable substituted imidazole is 2-phenylimidazole.

The imidazole or its derivatives, i.e., substituted imidazoles, that are adducted to epoxy resins, are preferably adducted to bisphenol A type epoxy resins. The imidazoles or imidazoles which are adducted to the epoxy resin and their derivatives have the general formula:

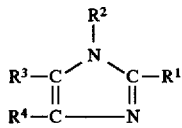

where $R^1$, $R^2$, $R^3$, and $R^4$ are H or any substitution which is non-reactive with the epoxy resin, with the R's if not H typically being alkyl, e.g., methyl, aryl, e.g., phenyl, or alkaryl groups, and with $R^2$, $R^3$ and $R^4$ preferably being H groups and $R^1$ preferably being a methyl group, i.e., 2-methylimidazole.

A preferred imidazole and epoxy resin adduct is sold under the tradename Epon Curing Agent P-101 by Shell Chemical Company. Another preferred imidazole adduct of a bisphenol A type epoxy resin is sold under the tradename HT 3261 by Ciba-Geigy Corporation. The imidazole or substituted imidazole residue, e.g., a 2-methylimidazole residue, typically comprises between about 5 and 50 wt. % of the imidazole/epoxy resin adduct composition, preferably between about 30 and 40 wt. %, with about 33 wt. % being most preferred.

It is believed that the epoxy component of the imidazole adduct readily promotes incorporation of the otherwise insoluble imidazoles in the epoxy resin component system. It is also believed that the formation of the adduct reduces the melting point of the imidazole, thereby lowering the cure reaction temperature between the epoxy groups and the adduct. It is further believed that the adduct when used alone without other curing agents allows the curing of the epoxy resin component to occur at significantly lower temperatures or at significantly higher rates. This allows for these powder coatings to be used on heat sensitive wood substrates without exposure of the substrate to excessive heat which tends to deteriorate the integrity of the wood.

In general, curing is believed to occur as the imidazole or imidazole adducted epoxy or quaternary ammonium salt thereof performs a ring opening operation on the epoxy ring of the epoxy resin component. This results in bonding between the epoxy group of the epoxy resin component and the C=N bond of the imidazole ring and formation of a quaternary ammonium salt with a highly reactive negatively charged oxygen available for further ring opening operations. The imidazole or adducted imidazole acts as a catalyst, moving from epoxy group to epoxy group as it grows and facilitates further epoxy group ring opening and epoxide cure reactions.

The catalytic cure agent is used at between about 1 and 8 parts per hundred resin (phr), most preferably between about 1 and 4 phr.

In another embodiment, the powder coating composition of the present invention contains a low temperature curing agent, either as the sole curing agent instead of the aforesaid catalytic curing agent, or in combination with the aforesaid catalytic curing agent. The low temperature curing agent may be selected from commercially available curing agents that are adducts of polyamines and epoxy resins, preferably adducts of an aliphatic primary or secondary polyamine and a bisphenol A type epoxy resin.

An example of suitable low temperature curing agent that is an epoxy adduct of an aliphatic polyamine is sold under the tradename PF LMB 5218 Hardener by Ciba-Geigy Corporation. Another preferred low temperature curing agent comprises an adduct of a secondary aliphatic polyamine and a bisphenol A epoxy resin which is sold under the tradename Ancamine 2014AS by Air Products & Chemicals.

When present, the low temperature curing agent is used in an amount ranging between about 5 and 40 phr, and, preferably between about 20 and 30 phr.

If used in combination with an aforesaid catalytic curing agent, for instance, a bisphenol A epoxy adduct of 2-methylimidazole, the catalytic curing agent is preferably employed in an amount ranging up to about 6 phr, and, preferably between about 2 and 4 phr.

Another curing agent that can be used in combination with the low temperature curing agent to enhance the curing properties is dicyandiamide. A suitable dicyandiamide curing agent is sold under the tradename Dyhard 100S by SKW Chemicals.

If present, the dicyandiamide curing agent is used in the powder coating composition in an amount ranging up to about 8 phr, preferably between about 2 and 8 phr, and, more preferably between about 4 and 6 phr.

The powder coating composition of the present invention does not include methylene disalicyclic acid as a curing agent.

In addition to the above components, the thermosetting powder compositions of the present invention include as another component, a texturing agent for achieving the desired grainy textured effect of the finish. The texturing agents which may be employed in the thermosetting powder coating compositions of the present invention are exemplified by, without limitation, organophilic clays, such as an organophilic clay sold under the tradename Bentone 27 and Bentone 38 by NL Chemicals, which are trialkylarylammoniumhectorite and tetraalkylammoniumsmectite, respectively, rubber particles, such as acrylonitrile butadiene copolymers, including those sold under the tradename Nipol 1422 and 1411 by Zeon Chemicals, and thermoplastic polymers, such as polypropylene. The amount of texturing agent used determines the coarseness or fineness of the texture. The texturing agent is used in a range up to about 30 phr, preferably between about 1 and 20 phr, and, most preferably between about 2 and 10 phr. If rubber particles are used as the texturing agent, it is generally preferred to incorporate them in the powder coating composition in an amount ranging between about 5 and 30 phr, and more preferably between about 10 and 20 phr. It is believed that the texturing agent contributes to the high viscosity and low melt flow of the powder coating composition leading to the textured finish and, thus, provides for better edge coverage and hiding of surface imperfections of wood substrates.

The thermosetting powder coatings of the present invention include as another component, a flow control agent. The flow control agents which may be employed in the thermosetting powder coating compositions are exemplified by, without limitation, acrylic resins. These acrylic resins are generally liquids which have been converted to powder form by absorption onto silica-type materials. A preferred flow control agent is sold under the tradename Resiflow P-67 acrylic resin by Estron Chemical, Inc., which is a 2-propenoic acid, ethyl ester polymer. Another preferred flow control agent is sold under the tradename Benzoin by DSM, Inc., which is a 2-hydroxy-1,2-diphenylethanone crystalline solid that is believed to keep the molten coating open for a suitable time to allow outgassing to occur prior to the formation of the hard set film. The flow control agent is used in a range between about 1 and 5 phr, preferably between about 1.5 and 2.5 phr.

Fumed silica and aluminum oxide may also be employed as a powder dry flow additive. An example of fumed silica is sold under the tradename Cab-O-Sil by Cabot Corporation. An example of aluminum oxide is sold under the tradename Aluminum Oxide C by Degussa Corporation.

In addition, the thermosetting powder coating compositions may contain as another component, pigments. Any of the usual pigments may be employed in the thermosetting powder coating of the invention to obtain the desired color and opacity. Examples of useful pigments for the black textured powder coatings include, without limitation, carbon black and black iron oxide. A preferred carbon black pigment is sold under the tradename Raven 22 and Raven 1255 by Columbian Chemical Company. An example of a useful pigment for white textured powder coatings include, without limitation, titanium dioxide. The pigment is used in a range up to about 100 phr, more preferably between about 1 and 4 phr for a black textured finish and between about 15 and 80 phr for a white textured finish.

The thermosetting powder coating compositions may contain as another component, extenders or fillers. Since a textured finish is desired, the extender loading can be rather high to lower the melt flow of the powder coating and allow the molten coating to cure while retaining some of the finish of the powder particles as applied. The level of extenders can also be used to control the coarseness or fineness of the finish. The extenders which may be employed in the thermosetting powder coating compositions of the present invention are exemplified by, without limitation, calcium carbonate, barium sulfate, wollastonite, and mica. The extender is used in a range up to 120 phr, more preferably between about 10 and 80 phr.

In addition to the above components, the thermosetting powder coating compositions of this invention may also contain the usual additives common to powder coatings. These additives include, without limitation, gloss control waxes, such as polyethylene, slip additives, such as Teflon and siloxanes, and the like.

The thermosetting powder coating compositions of this invention are prepared by conventional techniques employed in the powder coatings art. Typically, the components of the powder coating are thoroughly blended together and then melt blended in a extruder. Melt blending is generally carried out in the temperature range of between about 140° and 180° F. with careful control of the extruder temperature to minimize any curing and gelation from taking place in the extruder. The aforesaid extruder temperatures are lower than the typical cure temperatures of the powder coating composition that can begin initial curing at temperatures starting at 200° F. The extruded composition usually in sheet form, after cooling, is ground in a mill, such as a Brinkman mill or a Bantam hammer mill, to achieve the desired particle size. Particulate size also determines the coarseness or fineness of the texture of the hard set film coating that is produced. Generally, the particle size ranges from about 60 mesh (for coarse) to 200 mesh (for fine), depending upon the desired texture.

The thermosetting powder coating compositions of the present invention have very low cure temperature properties or very rapid cure rates. These properties provide a powder coating composition that can be readily applied, especially by electrostatically spraying, to heat sensitive materials, particularly wood products, while limiting the substrate heat exposure so as to not cause damage to the substrate. The cure time/temperature range of the thermosetting powder coatings of this invention range from about 30 seconds at about 350° F. peak substrate temperature down to about 20 minutes at about 225° F. peak substrate temperature. Cure times anywhere from about a few seconds to about 30 minutes can be considered normal or acceptable oven dwell times for electrostatic spray lines.

Furthermore, at these cure conditions, no significant outgassing is noticed from the wood substrate that could degrade the substrate integrity as well as form large noticeable craters and popping defects in the continuous hard cured textured finish. This film continuity is especially surprising as pinholes are much larger than the variations in the surface profile of the textured coating. It is also surprising that a smooth fine texture can be formed on unprimed surfaces, such as wooden particle board, without any evidence of outgassing. In addition, the high viscosity and low melt flow of these compositions that are provided for texturing allows the cured powder coating to uniformly cover and hide not only the face of the wood substrate, but also unexpectedly the edges of wood substrates, which are highly porous and, thus, most difficult to uniformly coat in an electrostatic spray coating process.

The preferred method used to apply the low temperature cure thermosetting powder coating compositions on the heat sensitive substrates is by electrostatic spraying. The preferred heat sensitive substrates to be coated are wood substrates. The method of the present invention accordingly will be discussed hereinafter with reference to electrostatic spraying methods on wood substrates. However, it should be understood that other fusion coating methods can be used and other heat sensitive substrates, such as plastic, paper, and cardboard, and composites and components with heat sensitive aspects, can be coated with the powder coatings of the present invention. Likewise, heat resistant substrates may be coated with the powder coatings of the present invention, such as metal, steel and other alloys, including building panels, rebars, pipelines, cold coil springs, and steel strapping, glass, ceramic, including ceramic tiles, carbon and graphite.

Electrostatic spraying of powder coatings is based on the principle of electrostatic charging. In electrostatic spraying, the powder particles receive charges by one of the two following methods. In the corona method, the powder coating particles are passed in a carrier gas stream through a corona discharge in a corona spray gun, and charge is transferred from the ionized discharged air molecules to the powder particles, whereby the powder particles become electrostatically charged. In the triboelectric method, use is made of the principle of frictional electricity. The powder particles rub against a friction surface of polytetrafluoroethylene, i.e., Teflon, in the tribo gun and are given an electrostatic charge which is opposite in polarity to the charge of the friction surface. Reference can be made to U.S. Pat. No. 4,747,546 (Talacko) for an example of an electrostatic spray gun which can perform both methods of powder particle charging.

After charging, the powder particles are ejected as a cloud through the spray gun nozzle by virtue of their charge and output carrier gas pressure to the vicinity of a grounded target substrate. The charged spray particles are attracted to the grounded substrate by virtue of the difference in their respective charges. This causes the particles to deposit as a uniform coating on the desired substrate, covering the entire substrate including faces and edges. The charged powder adheres to the substrate for a period generally sufficient to permit conveying the coated article to an oven. A subsequent bake, or curing, process in the oven transforms the powder into a uniform, continuous coating having the desired characteristics bound to the substrate.

In the method of the present invention, a heat sensitive substrate to be coated, preferably a wood article, is supported and moved on a grounded conveyor line extending through a spray station of an electrostatic spray coating apparatus. Either flat line or vertical line electrostatic spray equipment may be used, although a flat line is preferred. In a flat line apparatus, the conveyor belt can be impregnated with conductive metal strips or entirely covered with a metal sheet. Since the wood substrate is relatively non-conductive, typically only having about 3–10 wt. % free water for conductivity, the conductive metal placed behind the article more readily attracts the charged particles and rapidly discharges them to ground. This avoids an appreciable rise in the surface potential of the wood, thereby eliminating back ionization and allowing the particles to provide a uniform and thick powder coating on the wood.

Electrostatic spray guns, either corona or tribo guns, are arranged over the wood substrate traveling through the spray station for coating. In the method of the present invention, tribo guns are preferred. The application of the powder coating by triboelectric guns is especially preferred where the wood substrate to be coated has grooves and ridges, since the charge picked up by friction is much smaller than that picked up by the corona discharge, thereby reducing the Faraday effect. A plurality of tribo guns are situated adjacent one another and in one or more tiers. The powder is forced into the guns under about 40 psi pressure and air at about 20 psi pressure is passed into the powder conduits just before the powder passes into the spray nozzles. As the substrate travels into the spray station, the aforesaid low temperature cure thermosetting powder coating compositions of the present invention are electrostatically spray coated onto the wood. In a flat line, the one exposed face of the wood and the edges are coated with powder in a single pass. A second pass after curing is required to cover the other face. The line speed through the spray station in a flat line can be from about 5 to 200 feet per minute, preferably 20 to 100 feet per minute, most preferably from about 30 to 50 feet per minute. A flat line triboelectrostatic spray apparatus sold by Nordson Corporation can be used. Reference can be made to U.S. Pat. Nos. 4,498,913; 4,590,884; 4,723,505; 4,871,380; 4,910,1147; and, 5,018,909, all assigned to Nordson Corporation, for examples of flat line electrostatic spray equipment.

The substrate may also be pre-heated above ambient temperature or unheated prior to electrostatic deposition. With a cold sprayed substrate, very high intensity heating is required to melt the coating and then cure it upon the wood. The continuous exposure to high intensity heat tends to deteriorate the substrate. If the substrate is pre-heated and sprayed, however, then the melting and curing process occurs much faster, thereby enabling faster cure in the baking cycle. This also eliminates continuous exposure of the wood to high intensity heat, since in the electrostatic spraying step, the substrate is not exposed to heat. Preferably, the board is pre-heated to temperatures in the range between about 150° and 300° F., more preferably between about 180° and 250° F.

After the substrate is electrostatically spray coated, it is conveyed while bearing the powder to an oven for melting, film formation, and curing to form a heat set hard textured finish on the wood article. The powder coatings of this invention are preferably cured on the wood article along the cure time/temperature range of from about 30 seconds at about 350° F. peak substrate temperature (flat line) down to about 20 minutes at about 225° F. peak substrate temperature (vertical line). The curing ovens used preferably have several heating zones, some of which are heated by infrared lamps, others by heat convention, and still others by a combination of these two. An oven sold under the tradename Triad Speedoven by Thermal Innovations Corporation can be used for this purpose. In a flat line where conveyor speed is important and rapid cures are desired, the preferable oven residence time is less than about 2 minutes to achieve the desired cure. In a vertical line, where oven residence time can vary, the powder coatings can be cured in accordance with the entire cure time/temperature range.

In the method of the present invention, the dry thickness of the cure continuous grainy textured film ranges from about 1 to 8 mils thick, preferably about 2 to 6 mils thick.

The heat sensitive wood substrates electrostatically spray coated in this invention include, without limitation, hardwood, particle board, medium density fiber board (MDF), electrically conductive particle board (ECP) with conductive carbon black particles incorporated throughout the board, masonite board, or any other wood products. ECP is sold by Boise Cascade Corporation. Wood substrates having a moisture content of between about 3 and 10 wt. % are suitable for this invention. The wood substrates can also be pretreated with conductive coatings as are well known in the art to enhance electrostatic sprayability. The coated wood substrates are generally used to make articles having flat or profiled surfaces, such as computer furniture, business furniture, ready to assemble furniture, kitchen cabinets, and other wood products.

The invention will be further clarified by a consideration of specific examples which are intended to be purely exemplary of the invention. All parts and percentages specified herein are by weight unless otherwise stated.

EXAMPLE 1

Black Coarse Textured Epoxy Powder Coating Composition

A black coarse grainy textured thermosetting powder coating composition was prepared in accordance with the present invention by initially blending the following ingredients listed in Table 1.

TABLE 1

| Ingredient | Phr | Material | Use |
|---|---|---|---|
| Araldite GT 7072 Epoxy Resin | 100 | Bisphenol A/ Epichlorohydrin Type 2 Epoxy | Epoxy Resin |
| Epon Curing Agent P-101 | 2.0 | 2-Methyl Imidazole Adduct (33 wt. % Imidazole Residue) | Curing Agent |
| Resiflow P-67 | 1.4 | Acrylic Resin | Flow Additive |
| Benzoin | 0.8 | 2-Hydroxy-1,2-DiphenylEthanone | Flow Additive |
| Bentone 38 | 10 | Organophilic Clay | Texturing Agent |
| Raven 22 | 2.5 | Carbon Black | Pigment |
| Calcium Carbonate | 80 | Calcium Carbonate | Extender |

The ingredients were then melt blended in an extruder at temperatures below 180° F. The extruded material was mixed with from about 0.1 to 0.3 wt. % based on the weight of the extruded material, particularly about 0.2% of dry flow additive of Aluminum Oxide C aluminum oxide and then ground into powder. The powder particles were sieved using 100 mesh screen and the coarser particles were discarded. The powder particles were then electrostatically sprayed with a corona discharge gun onto both metal and wood panels and cured in an oven at about 225° F. peak substrate temperature for about 20 minutes. Gel time and hot plate melt flow were tested on the powder coating. Direct impact pencil hardness, flexibility, MEK resistance and gloss were tested on the metal panels and MEK resistance on the wood panels. The coating thickness was about 2 to 3 mils. The resulting properties are given in Table 2.

TABLE 2

| Property | Result |
| --- | --- |
| Gel Time at 400° F. (sec) | 15 |
| Hot Plate Melt Flow at 375° F. (min) | 13 |
| Direct Impact (in-lbs) | 160 |
| Reverse Impact (in-lbs) | 160 |
| Mandrel Flexibility | Pass (3/16") |
| MEK (50 double rubs) | Slight Rub Off |
| MEK (on wood) | Slight Rub Off |
| 60° Gloss | 0.8–1.5 |
| Pencil Hardness (gouge) | H |
| Texture | Coarse |

EXAMPLE 2

Black Fine Textured Epoxy Powder Coating Composition

A black fine grainy textured thermosetting powder coating composition was prepared in accordance with the present invention by initially blending the following ingredients listed in Table 3.

TABLE 3

| Ingredient | Phr | Material | Use |
| --- | --- | --- | --- |
| Araldite GT 7072 Epoxy Resin | 100 | Bisphenol A/ Epichlorohydrin Type 2 Epoxy | Epoxy Resin |
| Epon Curing Agent P-101 | 3.0 | 2-Methyl Imidazole Adduct (33 wt. % Imidazole Residue) | Curing Agent |
| Resiflow P-67 | 1.4 | Acrylic Resin | Flow Additive |
| Benzoin | 0.8 | 2-Hydroxy-1,2-DiphenylEthanone | Flow Additive |
| Bentone 38 | 10 | Organophilic Clay | Texturing Agent |
| Polyethylene Grade 6A | 2.0 | Polyethylene | Wax |
| Raven 1255 | 3.0 | Carbon Black | Pigment |
| Calcium Carbonate | 30 | Calciuin Carbonate | Extender |

The ingredients were then melt blended in an extruder at temperatures below 180° F. The extruded material was mixed with about 0.2% dry flow additive of Aluminum Oxide C aluminum oxide and then ground into powder. The powder particles were sieved using 200 mesh screen and the coarser particles were discarded. The powder particles were then electrostatically sprayed with a corona discharge gun onto metal panels and cured in an oven at about 225° F. peak substrate temperature for about 20 minutes. Gel time and hot plate melt flow were tested on the powder coating. Direct impact pencil hardness, flexibility, MEK resistance and gloss were tested on the metal panels. The coating thickness was about 2 to 3 mils thick. The resulting properties are given in Table 4.

TABLE 4

| Property | Result |
| --- | --- |
| Gel Time at 400° F. (sec) | 10 |
| Hot Plate Melt Flow at 375° F. (mm) | 13 |
| Direct Impact (in-lbs) | 160 |
| Mandrel Flexibility | Pass (1/8") |
| MEK (50 double rubs) | No Rub Off |
| 60° Gloss | 4.8 |
| Pencil Hardness (gouge) | 2H |
| Texture | Fine |

EXAMPLE 3

Triboelectric Spraying Of Black Fine Textured Epoxy Powder Coating Composition On Wooden Particle Board The black fine textured thermosetting powder coating composition of Example 2 was trioboelectrically sprayed with tribo guns on a particle board wood substrate using a Nordson Corporation flat line electrostatic spray apparatus in accordance with the present invention under the following conditions listed in Table 5.

TABLE 5

| Electrostatic Coating Processing Conditions | |
| --- | --- |
| Type of Substrate | Particle Board |
| Substrate Temperature | Room Temperature (≈75° F.) |
| Line Type | Flat Line |
| Coating Line Speed | 30 ft/min |
| Type of Electrostatic Charging | Triboelectric |
| Air Flow Pressure | 40 psi |
| Atomization Pressure | 20 psi |
| Measured Powder Charge | 2–3 μAmps |
| Curing Line Speed | 5 ft/min |
| Oven Size | 12 ft long (using only first 6 ft or 3 IR zones) |
| Peak Substrate Temperature | 350° F. |
| Maximum Time At Peak Temperature | 30 sec |
| Oven Exit Substrate Temperature | 210° F. |
| MEK (50 double rubs) | Slight-Moderate Rub Off |

EXAMPLE 4

Triboelectric Spraying Of Black Fine Textured Epoxy Powder Coating Composition On Wooden Electrically Conductive Particle Board The black fine textured thermosetting powder coating composition of Example 2 was trioboelectrically sprayed with tribo guns on electrically conductive particle board wood substrate using a Nordson Corporation flat line electrostatic spray apparatus in accordance with the present invention under the following conditions listed in Table 6.

TABLE 6

| Electrostatic Coating Processing Conditions | |
| --- | --- |
| Type of Substrate | ECP Board |
| Substrate Temperature | Pre-Heated |
| Pre-Heat Line Speed | 5 ft/min |
| Pre-Heat Oven Exit Substrate Temperature | 218° F. |
| Substrate Temperature Prior to Coating | 170° F. |
| Line Type | Flat Line |
| Coating Line Speed | 100 ft/min |
| Type of Electrostatic Charging | Triboelectric |

TABLE 6-continued

| Electrostatic Coating Processing Conditions | |
| --- | --- |
| Air Flow Pressure | 40 psi |
| Atomization Pressure | 20 psi |
| Measured Powder Charge | 2–3 µAmps |
| Curing Line Speed | 10 ft/min |
| Oven Size | 12 ft long (using only first 6 ft or 3 IR zones) |
| Oven Exit Substrate Temperature | 210° F. |
| MEK (50 double rubs) | Moderate Rub Off |

EXAMPLE 5

Corona Discharge Spraying Of Black Fine Textured Epoxy Powder Coating Composition On Wooden Particle Board The black fine textured thermosetting powder coating composition of Example 2 was electrostatically sprayed with corona guns on a particle board wood substrate using a vertical line electrostatic spray apparatus in accordance with the present invention under the following conditions listed in Table 7.

TABLE 7

| Electrostatic Coating Processing Conditions | |
| --- | --- |
| Type of Substrate | Particle Board |
| Substrate Temperature | Pre-Heated |
| Pre-Heat Oven Exit Substrate Temperature | 210° F. |
| Substrate Temperature Prior to Coating | 210° F. |
| Line Type | Vertical Line |
| Type of Electrostatic Charging | Corona Discharge |
| Measured Powder Charge | 60 KV |
| Curing Temperature | 225° F. |
| Curing Time | 20 min |
| Peak Substrate Temperature | 225° F. |
| Maximum Time At Peak Temperature | 20 min |
| MEK (50 double rubs) | Slight Rub Off |

EXAMPLE 6

Black Coarse Textured Epoxy Powder Coating Composition

A black coarse grainy textured thermosetting powder coating composition was prepared in accordance with the present invention by initially blending the following ingredients listed in Table 8.

TABLE 8

| Ingredient | Phr | Material | Use |
| --- | --- | --- | --- |
| Araldite GT 7072 Epoxy Resin | 100 | Bisphenol A/ Epichlorohydrin Type 2 Epoxy | Epoxy Resin |
| 2-Methyl Imidazole | 2.0 | 2-Methyl Imidazole | Catalytic Curing Agent |
| Resiflow P-67 | 1.4 | Acrylic Resin | Flow Additive |
| Benzoin | 0.8 | 2-Hydroxy-1,2-DiphenylEthanone | Flow Additive |
| Polyethylene Wax | 2.0 | Polyethylene | Gloss Control |
| Raven 1255 | 3.0 | Carbon Black | Pigment |
| Calcium Carbonate | 30 | Calcium Carbonate | Extender |
| Nipol 1422 | 17 | Precrosslinked Ground Acrylonitrile-Butadiene Copolymer | Texturing Agent |

The ingredients were then melt blended in an extruder at temperatures below 180° F. The extruded material was mixed with from about 0.2% of dry flow additive of aluminum oxide and then ground into powder. The powder particles were sieved using a 200 mesh screen and the coarser particles were discarded.

The powder particles were then tribo charged onto both metal panels and medium density fiberboards. The coated metal parts were cured in an oven at about 225° F. peak substrate temperature for about 20 minutes. The coated medium density fiberboards were cured in an infrared oven for about 2 minutes to raise the part surface temperature to about 300° F. The coating thickness was about 3 to 4 mils on metal and about 5 to 6 mils on wood. The resulting properties are given in Table 9.

TABLE 9

| Property | Result |
| --- | --- |
| Gel Time at 400° F. (sec) | 10 |
| Hot Plate Melt Flow at 375° F. (mm) | 12 |
| Direct Impact (in-lbs) | 160 |
| MEK (50 double rubs) | Slight Rub Off |
| MEK (on wood) | Slight Rub Off |
| 60° Gloss | 4–6 |
| Texture (on wood) | Tight |

EXAMPLES 7 to 9

White Textured Epoxy Powder Coating Compositions

Three white grainy textured thermosetting powder coating compositions were prepared in accordance with the alternative embodiment of the present invention by initially blending the following ingredients listed in Table 10.

TABLE 10

| Ingredient | Phr Ex. 7 | Phr Ex. 8 | Phr Ex. 9 | Material | Use |
| --- | --- | --- | --- | --- | --- |
| Araldite GT 7072 | 70 | 70 | 70 | Bisphenol A/ Epichlorohydrin Type 2 Epoxy | Epoxy Resin |
| Ancamine 2014AS | 30 | 30 | 30 | Epoxy and Polyamine Adduct | Low Temp. Curing Agent |
| Epon P-101 | — | 2.0 | — | Epoxy and 2-Methyl Imidazole Adduct (33 wt. % Imidazole Residue) | Catalytic Curing Agent |

TABLE 10-continued

| | Phr | | | | |
|---|---|---|---|---|---|
| Ingredient | Ex. 7 | Ex. 8 | Ex. 9 | Material | Use |
| Dyhard 100S | — | — | 5.0 | Dicyandiamide | Curing Agent |
| Resiflow P-67 | 1.4 | 1.4 | 1.4 | Acrylic Resin | Flow Additive |
| Benzoin | 0.8 | 0.8 | 0.8 | 2-Hydroxy-1,2-DiphenylEthanone | Flow Additive |
| Bentone 38 | 2.0 | 2.0 | 2.0 | Organophilic Clay | Texturing Agent |
| TiPure R902 | 30 | 30 | 30 | Titanium Dioxide | Pigment |

The aforesaid ingredients were then melt blended in an extruder at temperatures below 180° F. The extruded material was mixed with about 0.2% dry flow additive of Aluminum Oxide C aluminum oxide and then ground into powder. The powder particles were sieved using 200 mesh screen and the coarser particles were discarded.

The powder particles were electrostatically sprayed with a corona discharge gun onto metal panels and then cured in an oven at about 225° F. peak substrate temperature for about 20 minutes. Gel time and hot plate melt flow were tested on the coated metal panels. The coating thickness was about 2 to 3 mils thick.

The powder particles were also electrostatically sprayed with corona discharge onto preheated medium density fiber boards that were preheated to about 250° to 270° F. peak substrate temperature for about 2 minutes and then cured in an infrared oven at about 300° F. peak substrate temperature for about 40 seconds. MEK resistance and texture were evaluated on the coated wood board. The resulting properties are given in Table 11.

TABLE 11

| | Result | | |
|---|---|---|---|
| Property | Ex. 7 | Ex. 8 | Ex. 9 |
| Gel Time at 400° F. (sec) | 11 | 8 | 9 |
| Hot Plate Melt Flow at 375° F. (mm) | 18 | 16 | 13 |
| MEK (on wood) | Moderate Rub Off | Slight Rub Off | No Rub Off |
| Texture (on wood) | Rolling | Tight | Dry |

The U.S. patents mentioned herein throughout this specification are all incorporated by reference herein in their entireties.

The invention having been disclosed in the foregoing embodiments and examples, other embodiments of the invention will be apparent to persons skilled in the art. The invention is not limited to the exemplary embodiments and examples disclosed. Accordingly, reference should be made to the appended claims to assess the true spirit and scope of the invention in which exclusive rights are claimed.

What is claimed is:

1. A thermosetting powder coating composition for forming a grainy textured finish, which is a composition in particulate blend form consisting essentially of effective film-forming amounts of an epoxy resin, a catalytic curing agent which is selected from an imidazole and an adduct of an imidazole and epoxy resin, and a texturing agent.

2. The composition of claim 1, in which said epoxy resin is selected from bisphenol A type epoxy resins having epoxy equivalent weights of between about 600 and 750 and mixtures of such epoxy resins.

3. The composition of claim 1 comprising between about 1 and 8 phr of said catalytic curing agent, between about 1 and 30 phr of said texturing agent, and between about 1 and 5 phr of a flow control agent.

4. The composition of claim 3 further comprising up to about 120 phr of an extender.

5. The composition of claim 4 further comprising up to about 100 phr of a pigment.

6. The composition of claim 1, in which said texturing agent is selected from organophilic clays, crosslinked rubber particles, and thermoplastic polymer particles.

7. The composition of claim 1, in which said composition has a cure time/temperature range of from about 30 seconds at about 350° F. peak substrate temperature down to about 20 minutes at about 225° F. peak substrate temperature.

8. The composition of claim 1, in which said composition can melt, flow and cure to form a continuous grainy textured dry film finish.

9. The composition of claim 1, in which said catalytic curing agent is an imidazole.

10. The composition of claim 9, in which said catalytic curing agent is 2-methylimidazole.

11. The composition of claim 1, in which said catalytic curing agent is an adduct of an imidazole and epoxy resin.

12. The composition of claim 11, in which said catalytic curing agent is an adduct of an imidazole and bisphenol A type epoxy resin.

13. The composition of claim 12, in which said catalytic curing agent is an adduct of 2-methylimidazole and bisphenol A type epoxy resin.

14. The composition of claim 11, in which said imidazole residue comprises between about 5 and about 50 wt. % of said adduct.

15. The composition of claim 1, in which said composition can be coated and cured on heat sensitive substrates at a constant bake temperature for a continuous time without causing heat damage to the substrates.

16. The composition of claim 15, in which said heat sensitive substrates are wood substrates.

17. A coated wood substrate having the thermosetting powder coating composition of claim 1 electrostatically coated and cured thereon to a grainy textured finish.

18. A thermosetting powder coating composition for forming a grainy textured finish, which is a composition in particulate blend form consisting essentially of effective film-forming amounts of an epoxy resin, a curing agent which comprises an adduct of a polyamine and an epoxy resin, and a texturing agent.

19. The composition of claim 18, in which said epoxy resin is selected from bisphenol A type epoxy resins having epoxy equivalent weights of between about 600 and 750 and mixtures of such epoxy resins.

20. The composition of claim 18 comprising between about 5 and 40 phr of said curing agent, between about 1 and 30 phr of said texturing agent, and between about 1 and 5 phr of a flow control agent.

21. The composition of claim 20 further comprising up to about 120 phr of an extender.

22. The composition of claim 21 further comprising up to about 100 phr of a pigment.

23. The composition of claim 18 further comprising a catalytic curing agent selected from an imidazole and an adduct of an imidazole and an epoxy resin.

24. The composition of claim 22 further comprising between about 1 and 6 phr of a catalytic curing agent selected from an imidazole and an adduct of an imidazole and an epoxy resin.

25. The composition of claim 18 further comprising a second curing agent of dicyandiamide.

26. The composition of claim 22 further comprising between about 2 and 8 phr of a second curing agent of dicyandiamide.

27. The composition of claim 18, in which said curing agent comprises an adduct of a primary or secondary polyamine and a bisphenol A type epoxy resin.

28. The composition of claim 23, in which said catalytic curing agent comprises an adduct of an imidazole and a bisphenol A type epoxy resin.

29. The composition of claim 23, in which said catalytic curing agent comprises 2-methylimidazole.

30. The composition of claim 18, in which said texturing agent is selected from organophilic clays, crosslinked rubber particles, and thermoplastic polymer particles.

31. The composition of claim 18, in which said composition has a cure time/temperature range of from about 30 seconds at about 350° F. peak substrate temperature down to about 20 minutes at about 225° F. peak substrate temperature.

32. The composition of claim 18, in which said composition can melt, flow and cure to form a continuous grainy textured dry film finish.

33. A coated wood substrate having the thermosetting powder coating composition of claim 18 electrostatically coated and cured thereon to a grainy textured finish.

34. The composition of claim 18, in which said composition can be coated and cured on heat sensitive substrates at a constant bake temperature for a continuous time without causing heat damage to the substrate.

35. The composition of claim 34, in which said heat sensitive substrates are wood substrates.

36. A thermosetting powder coating composition for forming a grainy textured finish suitable for heat sensitive substrates, which is a film-forming composition in particulate blend form consisting essentially of a film-forming bisphenol A type epoxy resin, between about 1 and 8 phr of a catalytic curing agent selected from an imidazole or an adduct of an imidazole and a bisphenol A type epoxy resin, between about 1 and 30 phr of a texturing agent selected from organophilic clays, crosslinked rubber particles and thermoplastic polymer particles, between about 1 and 5 phr of a flow control agent, up to about 120 phr of an extender, and up to about 100 phr of a pigment.

37. A thermosetting powder coating composition for forming a grainy textured finish suitable for heat sensitive substrates, which is a film-forming composition in particulate blend form consisting essentially of a film-forming bisphenol A type epoxy resin, between about 1 and 8 phr of a catalytic curing agent selected from an imidazole, between about 1 and 30 phr of a texturing agent selected from organophilic clays, crosslinked rubber particles, and thermoplastic polymer particles, between about 1 and 5 phr of a flow control agent, up to about 120 phr of an extender, and up to about 100 phr of a pigment.

38. A thermosetting powder coating composition for forming a grainy textured finish suitable for heat sensitive substrates, which is a film-forming composition in particulate blend form consisting essentially of a film-forming bisphenol A type epoxy resin, between about 5 and 40 phr of a curing agent selected from an adduct of a polyamine and a bisphenol A type epoxy resin, between about 1 and 30 phr of a texturing agent selected from organophilic clays, crosslinked rubber particles, and thermoplastic polymer particles, between about 1 and 5 phr of a flow control agent, up to about 120 phr of an extender, and up to about 100 phr of a pigment.

39. The composition of claim 38 further comprising up to about 8 phr of a second curing agent of dicyandiamide.

40. The composition of claim 39 further comprising up to about 6 phr of a catalytic curing agent selected from an imidazole and an adduct of an imidazole and a bisphenol A epoxy resin.

41. A method of coating a heat sensitive material with a thermosetting powder coating composition adapted to provide a grainy textured dry film finish without damaging the substrate, which comprises:

a. applying a thermosetting powder coating composition to a heat sensitive substrate, wherein said powder coating composition is in particulate blend form consisting essentially of effective film-forming amounts of an epoxy resin, a catalytic curing agent selected from an imidazole and an adduct of an imidazole and epoxy resin, a texturing agent, and a flow control agent, said powder coating composition further having a cure time/temperature range of from about 30 seconds at about 350° F. peak substrate temperature down to about 20 minutes at about 225° F. peak substrate temperature; and, b. heating said powder coated substrate in said cure time/temperature range to melt, flow and cure said powder coating as a grainy textured dry film on said substrate without damaging the substrate.

42. The method of claim 41, in which said heat sensitive material is a wood substrate.

43. The method of claim 42, in which said wood substrate is selected from hardwood, particle board, masonite board, electrically conductive particle board, and medium density fiber board.

44. The method of claim 41, in which said applying step a) comprises applying said powder coating by electrostatic spraying onto said substrate.

45. The method of claim 41, in which said heating step b) comprises heating said substrate in an oven selected from convention, infrared, and combination ovens.

46. A coated wood substrate produced according to the method of claim 41, in which said thermosetting powder coating composition is applied in step a) by electrostatically spray coating.

47. A method of coating a heat sensitive material with a thermosetting powder coating composition adapted to provide a grainy textured dry film finish without damaging the substrate, which comprises:

a. applying a thermosetting powder coating composition to a heat sensitive substrate, wherein said powder coating composition is in particulate blend form consisting essentially of effective film-forming amounts of an epoxy resin, a curing agent which comprises an adduct of a polyamine and an epoxy resin, a texturing agent and a flow control agent, optional dicyandiamide, and optional catalytic curing agent of an imidazole or an adduct of imidazole and epoxy resin, said powder coating composition further having a cure time/temperature range of from about 30 seconds at about 350° F. peak substrate temperature down to about 20 minutes at about 225° F. peak substrate temperature; and, b. heating said powder coating and said substrate in said cure time/temperature range to melt, flow and cure said powder coating as a grainy textured dry film on said substrate without causing damage to the substrate.

48. The method of claim 47, in which said heat sensitive material is a wood substrate.

49. The method of claim 48, in which said wood substrate is selected from hardwood, particle board, masonite board, electrically conductive particle board, and medium density fiber board.

50. The method of claim 47, in which said applying step a) comprises applying said powder coating by electrostatic spraying onto said substrate.

51. The method of claim 47, in which said healing step b) comprises heating said substrate in an oven selected from convention, infrared, and combination ovens.

52. A coated wood substrate produced according to the method of claim 47, in which said thermosetting powder coating composition is applied in step a) by electrostatically spray coating.

* * * * *

UNITED STATES PATENT AND TRADEMARK OFFICE
CERTIFICATE OF CORRECTION

PATENT NO. : 5,721,052
DATED : February 24, 1998
INVENTOR(S) : Muthiah et al.

It is certified that error appears in the above-identified patent and that said Letters Patent is hereby corrected as shown below:

On the title page,:
  Item [56], under Refs. Cited, "Kraegen et al." should read -- Kroeger et al. --.
Col. 2, Ln. 44, "final/coatings" should read -- final coatings --.
Col. 9, Lns. 41-42, "4,910,1147" should read -- 4,910,147 --.

Signed and Sealed this

Twentieth Day of July, 1999

Attest:

Q. TODD DICKINSON

*Attesting Officer*    *Acting Commissioner of Patents and Trademarks*